(12) United States Patent
Boira Bonhora et al.

(10) Patent No.: US 10,677,582 B2
(45) Date of Patent: Jun. 9, 2020

(54) METHOD AND DEVICE FOR DETECTING DEFECTS IN THE CLOSURE OF ENCAPSULATED VIALS

(71) Applicant: GRIFOLS WORLDWIDE OPERATIONS LIMITED, Dublin (IE)

(72) Inventors: Jordi Boira Bonhora, Parets del Valles (ES); Carlos Roura Salietti, Parets del Valles (ES); Jose Coca Garrote, Parets del Valles (ES)

(73) Assignee: GRIFOLS WORLDWIDE OPERATIONS LIMITED, Dublin (IE)

( * ) Notice: Subject to any disclaimer, the term of this patent is extended or adjusted under 35 U.S.C. 154(b) by 0 days.

(21) Appl. No.: 16/507,660

(22) Filed: Jul. 10, 2019

(65) Prior Publication Data

US 2020/0033271 A1    Jan. 30, 2020

(30) Foreign Application Priority Data

Jul. 30, 2018    (EP) .................................... 18382571

(51) Int. Cl.
*G01B 11/00*    (2006.01)
*G01N 21/90*    (2006.01)
(Continued)

(52) U.S. Cl.
CPC .............. *G01B 11/00* (2013.01); *G01B 11/08* (2013.01); *G01B 11/2518* (2013.01); *G01N 21/8851* (2013.01); *G01N 21/909* (2013.01); *G01N 21/9054* (2013.01); *G01N 21/9508* (2013.01); *G06T 7/0002* (2013.01); *A61J 1/1412* (2013.01);
(Continued)

(58) Field of Classification Search
None
See application file for complete search history.

(56) References Cited

U.S. PATENT DOCUMENTS

| 2013/0278927 A1 | 10/2013 | Johnson et al. |
| 2016/0033262 A1 | 2/2016 | Kessler et al. |
| 2018/0038804 A1 | 2/2018 | Buchwald et al. |

FOREIGN PATENT DOCUMENTS

| CA | 2 346 278 A1 | 11/2002 |
| DE | 10 2015 203 726 A1 | 9/2016 |

(Continued)

OTHER PUBLICATIONS

European Search Report for corresponding European Patent Application No. 18382571.0 dated Jan. 29, 2019, 7 pages.

*Primary Examiner* — Michelle M Iacoletti
(74) *Attorney, Agent, or Firm* — Merchant & Gould P.C.

(57) ABSTRACT

A method and device detect defects in the closure of encapsulated vials. The method includes scanning a profile of the capsule and of the vial using a profilometer, thus obtaining a point cloud. From the point cloud obtained, calculating at least one of the following parameters: diameter or radius of the closure circumference of the capsule; angle of intersection between the lower skirt and the side of the capsule; length of the lower skirt; and/or a distance from the end of the lower skirt to the neck of the vial. The method determines whether any of the parameters calculated in the previous step exceeds a predetermined value. The device detecting defects in the closure of encapsulated vials includes a profilometer configured to scan a profile of the capsule and of the vial and a control device configured to execute the method.

17 Claims, 12 Drawing Sheets

(51) Int. Cl.
*G01N 21/88* (2006.01)
*G01N 21/95* (2006.01)
*G01B 11/08* (2006.01)
*G01B 11/25* (2006.01)
*G06T 7/00* (2017.01)
*A61J 1/14* (2006.01)

(52) U.S. Cl.
CPC . *G01N 2021/8887* (2013.01); *G01N 2201/10* (2013.01)

(56) References Cited

FOREIGN PATENT DOCUMENTS

| | | |
|---|---|---|
| EP | 1 270 433 A2 | 1/2003 |
| GB | 2 135 447 A | 8/1984 |
| WO | 95/04267 A1 | 2/1995 |
| WO | 02/057709 A2 | 7/2002 |
| WO | 2012/061441 A1 | 5/2012 |
| WO | 2016/202528 A1 | 12/2016 |

# METHOD AND DEVICE FOR DETECTING DEFECTS IN THE CLOSURE OF ENCAPSULATED VIALS

This application claims benefit of European Patent Application No. 18382571.0, filed 30 Jul. 2018 and which application is incorporated herein by reference. To the extent appropriate, a claim of priority is made to the above-disclosed application.

BACKGROUND OF THE INVENTION

The present invention relates to a novel method and device for detecting defects in the closure of vials. More specifically, the present invention discloses a novel method and device for detecting defects in the closure of encapsulated vials.

These days, especially in the pharmaceutical industry, the use of vials is widespread. The vials are generally small receptacles which can be used to contain medicines, samples, etc. in the form of liquids, powders or capsules. The vials may have different types of closure, such as encapsulated caps, screw-on caps, flip-up caps, rubber caps or similar, etc.

To prevent losses and/or contamination of the contents of the vial, it is very important to ensure the correct closure thereof. Among the defects that may occur in the closure of vials, particularly noteworthy is the lack of seal of said closure; however, this defect is not the only one, as vials having a sealed closure may have another type of defect which, over time, may ultimately compromise the integrity or seal of the closure. An example of defects of this type might be nicks in the capsule of the encapsulated vials, particularly nicks in the lower skirt of the capsule.

To prevent possible problems associated with a defective closure of the vial, quality controls of said closure must be put in place. On a small scale, manual inspection of the vials by an operator is feasible, but on a medium or large scale manual inspection is not feasible owing to obvious productivity problems. Because of this, over time various devices for automatically inspecting the closure of vials have appeared.

Patent application publication document PCT WO 02/057709 A2 discloses a method and apparatus for detecting the presence of a closure on a container and determining whether said closure is properly seated. Said apparatus includes at least two fibre optic heads positioned opposite one another on either side of a conveyor belt or other package transport mechanism. The fibre optic heads face one another across the path of travel of a package. The optical fibres of the receiving head are arranged in a rectangular shape, narrow in the horizontal direction and long in the vertical direction. The optic heads are connected to an optical sensor having an analogue output. As a package having a closure travels down the transport mechanism, the package closure interrupts portions of the light beam directed at the receiving head. The optical sensor generates an analogue trace signal as the closure moves down the conveyor. A processor samples the analogue signal and determines the presence and/or position of the closure therefrom.

Patent application publication document PCT WO 2012/061441 A1 discloses a system for inspecting the closures of packaged products employing lasers and receivers to scan multiple sides of a package, thereby measuring and determining a pass/fail status of a parameter of a package closure. In one embodiment, the system employs two lasers each emitting a beam that crosses one another, as well as product inspection path. Preferably, the parameter of a package closure which is evaluated is the separation between the lower surface of the cap and the upper surface of the neck of the vial.

The two documents mentioned above both disclose devices which inspect the closure of vials by optical means, in other words, without the need for physical contact between the inspection device and the vial, and they only evaluate the position of the cap relative to the package. Both systems are incapable of evaluating possible defects in a capsule which encloses said cap, and the use thereof is therefore not recommended for inspecting encapsulated vials.

Patent application publication document PCT WO 95/04267 A1 discloses a machine for inspecting translucent bottles or similar articles, comprising an inspection station for checking the article walls, the station being provided with an illuminating device, an imaging device and an intermediate mirror assembly which creates at least two beams, as well as a conveyor which carries the bottles in single file between the beams. In order to improve on such an inspection machine, the invention provides for a mirror assembly which creates at least three beams which illuminate the side wall of a bottle under inspection from different directions. Said device may have a first camera inspecting the side walls of the bottle and a second camera for inspecting the outline and/or height and/or colour of the bottles to be inspected.

The inspection machine disclosed by document WO 95/04267 A1 only inspects the walls of the bottles, that is, said machine does not inspect the closure thereof, and consequently is not capable of detecting defects in said closure.

Patent application publication document PCT WO 2016/202528 A1 discloses a method for inspecting containers, in particular bottles, wherein the closed containers are transported by means of a transport apparatus and closures applied to the containers are inspected with regard to tightness and/or correct seating by an inspection device. By means of an optical 3D (three-dimensional) measurement method, the inspection device at least partially senses a container together with the closure of the container and generates 3D data thereof, in particular, 3D points, 3D line elements and/or 3D surface elements. Said 3D data are processed by means of an evaluation apparatus and the tightness and/or correct seating of the closure is thereby inferred. Said 3D optical measurement method comprises 3D stereoscopic measurement by capturing images of at least a portion of the receptacle and of the closure from at least two points of view.

Document WO 2016/202528 A1 also discloses a container inspection device which comprises a transport apparatus for transporting a closed container which comprises a closure connected to said container, a 3D optical measurement device to capture a 3D image of at least a portion of the container and of the closure; and an evaluation device to process the 3D image in order to determine the tightness and correct seating of the closure in relation to the container. Said 3D optical measuring device is connected to a diffuse or structured light source and may be a camera which comprises a stereoscopic lens or two or more cameras, each comprising a lens.

Although the method and the device disclosed by document WO 2016/202528 A1 may be used for a variety of containers and closures, said document does not disclose that said method and device can be used to inspect encapsulated vials and/or encapsulated closures, and consequently neither does it disclose what parameters should be evaluated in order to be able to detect defects in the closure of encapsulated vials. In addition, said method and device have the drawback that measurement of an object in three dimensions by triangulation of points from two images requires a high computational load.

SUMMARY OF THE INVENTION

An object of the present invention is to disclose a method for inspecting the closure of encapsulated vials that allows defects in said closure to be detected and which overcomes the problems of the above-mentioned methods. To do this, the present invention discloses a method for detecting defects in the closure of encapsulated vials which comprises the following steps:

a) Scanning a profile of the capsule and of the vial using a profilometer, said profile corresponding to a generatrix of the vial which defines a head, a side and a lower skirt of said capsule, thus obtaining a point cloud.

b) From the point cloud obtained in the previous point, calculating at least one of the following parameters:
  i. Diameter or radius of the closure circumference of the capsule, said closure circumference being defined by the circumference defined by the fold of the lower skirt of the capsule relative to the side thereof.
  ii. Angle of intersection between the lower skirt and the side of the capsule.
  iii. Length of the lower skirt.
  iv. Distance from the end of the lower skirt to the neck of the vial.

c) Determining whether any parameter calculated in the previous point exceeds a predetermined limit value, said limit value indicating whether the encapsulation is or is not correct.

Preferably, said point cloud is obtained using a laser profilometer, that is, said profilometer measures the surface of the capsule and of the vial by optical means, that is, without contact. Advantageously, said profilometer measures in two dimensions or 2D, that is, in one plane. Using a 2D profilometer a point cloud is obtained in a Cartesian plane, that is, in a plane defined by the abscissa and ordinate axes, thus obtaining the profile of the capsule and of the vial as if a cut had been made through a cutting plane. Alternatively, said profilometer measures in three dimensions.

Advantageously, the profile of the capsule and of the vial is measured by profilometer using at least two different exposure times.

Preferably, the calculation of the diameter or radius of the closure circumference of the capsule comprises the following steps:

a) Calculating a regression circumference of the closure of the capsule from the point cloud of the side and lower skirt of the capsule.

b) Measuring the diameter or radius of the regression circumference, estimating that said regression circumference is equal to the closure circumference of the capsule.

Advantageously, the calculation of the angle of intersection between the lower skirt and the side of the capsule comprises the following steps:

a) Calculating the regression line of the side of the capsule from the point cloud.

b) Calculating the regression line of the lower skirt of the capsule from the point cloud.

c) Determining the point of intersection between both regression lines and the angle formed therebetween.

Preferably, the calculation of the length of the lower skirt comprises the following steps:

a) Determining the end point of the lower skirt.

b) Determining the end point of the fold between the side and the lower skirt of the capsule.

c) Measuring the distance between both points.

Advantageously, the calculation of the distance from the end of the lower skirt to the vial comprises the following steps:

a) Determining the end point of the lower skirt, if not previously determined.

b) Determining the end point of the neck of the vial.

c) Measuring the distance between both points.

According to another aspect of the invention, also disclosed is a device for detecting defects in the closure of encapsulated vials which comprises a profilometer configured to scan a profile of the capsule and of the vial and a control device configured to execute a method such as that described earlier.

Preferably, said profilometer is a laser profilometer, that is, a contactless measurement device. Advantageously, said profilometer is a two-dimensional profilometer, that is, one that measures in two dimensions. A point cloud is thus obtained in a single plane which corresponds to the profile of the capsule and of the vial. This measurement is taken directly and with no need to carry out triangulations, image processing or other type of complex operations.

Preferably, said control device also comprises a vial supply device. Advantageously, said vial supply device operates continuously. The above allows the control device to operate in an automated and uninterrupted manner, as said vial supply device is responsible for transferring the next vial to the control device once the inspection of the vial is complete. Advantageously, said vial supply device may also remove the vial from the control device after being inspected.

Preferably, said profilometer carries out the measurement of the profile using two different exposure times. Preferably, the first exposure time is between 20 µs and 100 µs and the second exposure time is between 150 µs and 500 µs. More preferably, the first exposure time is between 30 µs and 50 µs. More preferably, the second exposure time is between 250 µs and 350 µs. Owing to the use of two different exposure times a precise measurement can be taken along the entire profile of the capsule and of the vial because, since said capsule and vial are usually made of different materials, they also have different optical properties; therefore, particular reflection times are effective for measuring the capsule but produce high reflection on the vial, or vice versa. In other words, said reflection times are effective for measuring the vial but produce high reflection on the capsule. By combining the measurements obtained using both exposure times a precise reading can be obtained along the entire length of the profile of the encapsulated vial.

In one embodiment, the profilometer takes the measurement of the profile using more than two different exposure times. In said embodiment, the multiple measurements are combined in order to obtain a precise reading of the profile of the vial and of the capsule thereof. In another alternative embodiment, the profilometer takes the measurement of the profile using a single exposure time.

Preferably, the device comprises means for rotating the vial on its own longitudinal axis, thus obtaining the profile of the capsule and of the vial along the entire circumference of said capsule and vial. Advantageously, the control device is configured to correct and/or absorb small deviations between the axis of rotation of the vial and the geometric longitudinal axis thereof; in other words, the control device is configured to correct the variations that might be produced if the encapsulated vial rotates eccentrically.

Alternatively, the device comprises means for rotating the profilometer about the longitudinal axis of the vial, thus obtaining the profile of the capsule and of the vial along the entire circumference of said capsule and vial. Preferably, the control device is configured to correct and/or absorb small deviations between the axis of rotation of the profilometer and the longitudinal geometric axis of the encapsulated vial; in other words, the control device is configured to correct the variations that might be produced if the circumference described by the path of the profilometer and the vial are not concentric.

By rotating the encapsulated vial or the profilometer a three-dimensional measurement of the encapsulated vial can be obtained from two-dimensional measurements, and it is therefore possible to detect defects over the entire perimeter of the capsule of the vial. In this case, preferably, the separation between different measurement planes is small, for example, 0.5 or 1 degree of circumference. However, it is also possible to take more spaced out measurements, for example, in planes separated by 45, 90 or 120 degrees, thus checking the encapsulation at eight, four or three points respectively. It should be understood that the above examples are simply illustrative and not limiting, and it is possible to modify the separation between planes as required.

The device for detecting defects in the closure of encapsulated vials described above may be used either separately, that is, without being associated with other machines or devices, or in a manner associated with other equipment forming part of a production or packaging line.

In this document, the directions horizontal, vertical, up, down, etc. are understood in relation to the normal working position of the device for detecting defects in the closure of encapsulated vials, that is, with the longitudinal axis of the encapsulated vials perpendicular to the ground.

BRIEF DESCRIPTION OF THE DRAWINGS

For a better understanding, the accompanying drawings are given as an explanatory but not limiting example of an embodiment of the method and of the device for detecting defects in the closure of encapsulated vials according to the present invention.

In the figures, similar or equivalent elements have been identified with identical reference numerals.

DETAILED DESCRIPTION OF THE PREFERRED EMBODIMENTS

Figure 1:
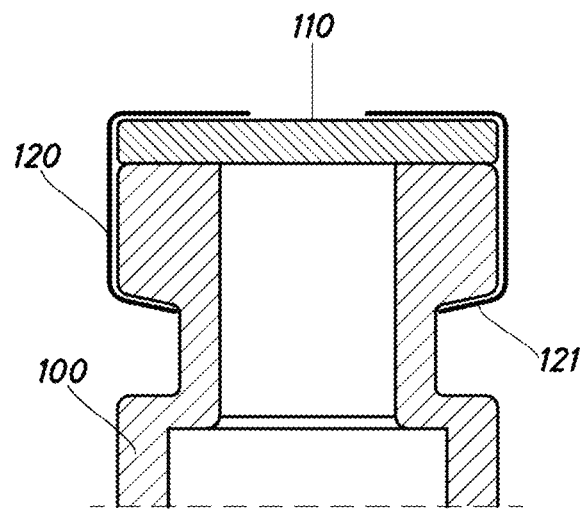
FIG. 1 shows two different vials correctly encapsulated.
Figure 1:
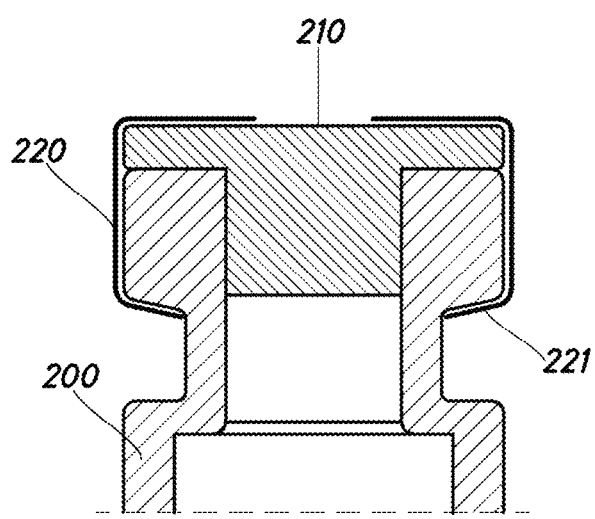

FIG. 1 shows two different vials correctly encapsulated. As can be seen, both vials -100-,-200- have a cap -110-,-210- and a capsule -120-,-220- responsible, among other things, for holding the cap -110-,-210- firmly attached to the respective vial -100-,-200- so that a sealed closure is created. The main difference between the two vials -100-,-200- arises from the fact that the vial -100- has a planar cap -110- positioned above the neck thereof, whereas the vial -200- has a cap -210- which is inserted in the neck or mouth thereof. On both vials -100-,-200- the respective capsule -120-,-220- tightly surrounds the head of the vial -100-,-200-; additionally, as well as fitting tightly on the lower portion of the head of the respective vial -100-,-200-, the lower skirt -121-,-221- of the capsules -120-,-220- has a length similar to that of the head, thus reaching as far as, or practically as far as, the neck of the vial -100-,-200-.

Although In FIG. 1 only two types of encapsulated vials have been illustrated, the present invention allows defects to be detected in the closure of any type of encapsulated vials. To do this, all that is necessary is to adapt the parameters and limit values to each vial typology inspected. In addition, the device for inspecting defects in the closure of vials may be used to detect defects in vials which have other types of closures, such as screw-on caps, flip-up caps, etc. To do this, all that is necessary is to modify the programming of the control device so as to evaluate parameters specific to each type of closure.

Figure 2:
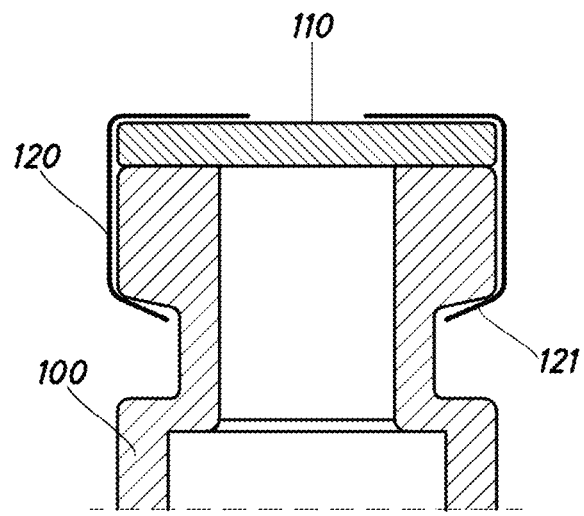
FIG. 2 shows the vials of FIG. 1 having defective encapsulations.
Figure 2:
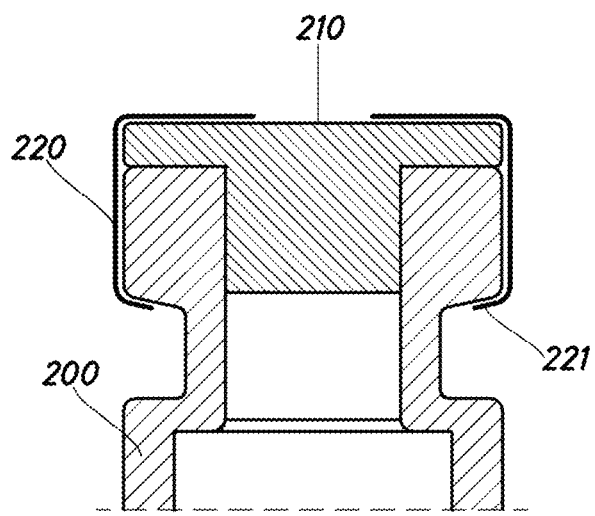

In FIG. 2 the vials of FIG. 1 can be seen, but having defective encapsulations. As can be seen, in the vial -100- the lower skirt -121- is too open; in other words, it is not fitted tightly enough to the lower portion of the head of said vial -100-. In the vial -200- the length of the lower skirt -221- is too short, thus preventing correct fitting of the capsule -220- to the head of the vial -200-. Both types of defects may cause a loss of the hermetic seal of the closure or even the loss of the product contained in the respective vial.

The defects illustrated above are only two examples of defects that can be detected using the method and the device object of the present invention. However, the present invention allows a greater variety of defects in the closure of encapsulations of vials to be detected.

Figure 3:
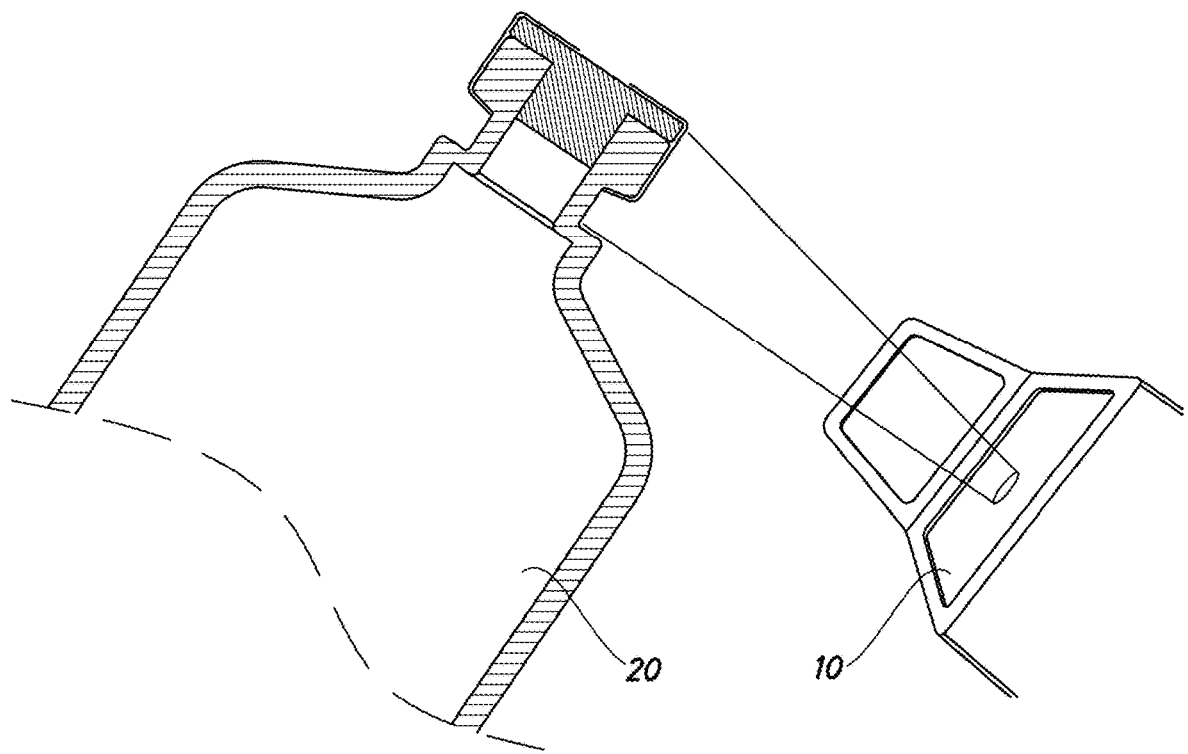
FIG. 3 is a schematic view of an embodiment of a device for detecting defects in the closure of encapsulated vials.

FIG. 3 is a schematic view of an embodiment of a device for detecting defects in the closure of encapsulated vials according to the present invention. As can be seen, the profilometer -10- measures a profile of the encapsulated vial -20- using optical means, that is, with no contact. In the embodiment shown measurement is carried out in one plane, that is, in two dimensions, more specifically in the plane of incidence of the laser beam emitted by the profilometer -10-.

As mentioned earlier, in the embodiment shown the measurements of the profile of the vial and the capsule are taken in two dimensions, and therefore only defects in the encapsulation of the vial that are present in said plane can be detected. However, embodiments exist which allow defects to be detected at a plurality of points on the perimeter of the encapsulation, for example, four points separated from one another by 90 degrees. Said separation between different measurement planes can be reduced to a point where measurement can be considered to be continuous along the entire length of the perimeter of the capsule and of the vial, for example, by measuring every 0.5 or 1 degree of circumference. Thus, an essentially three-dimensional measurement of the vial is obtained by linking the plurality of measurements made in one plane or in two dimensions.

The above-described device for detecting defects in the closure of encapsulated vials may be used separately, in other words, as a quality control station independent of the production or bottling line, or may be associated with a vial production or bottling line.

In order to allow multiple measurement points along the circumference of the vial, various embodiments of the present invention exist in which, while the profilometer is in a fixed position, the vial rotates about its longitudinal axis. In other embodiments, the vial remains in a fixed position and it is the profilometer which rotates about the longitudinal axis of the vial. In both embodiments the rotation is produced by a motor which actuates a corresponding mechanism.

Although optional, preferably the control device of the device for detecting defects in the closure of encapsulated vials according to the present invention is configured to absorb and/or correct small eccentricities in the rotation of the vial or of the profilometer. Depending on the type of embodiment, said eccentricities may be due to misalignments between the longitudinal axis of the vial and the axis of rotation of the profilometer or to misalignments between the axis of rotation of the vial and the geometric axis thereof.

The use of multiple measurement planes along the perimeter of the vial and the respective capsule thereof allows the inspection quality to be raised, that is, it increases the probability of detecting defects in the encapsulation, should said defects exist. In addition, by using continuous or substantially continuous measurements, defects can be located that are difficult to detect by more isolated measurements, such as nicks in the lower skirt of the capsule.

Figure 4:
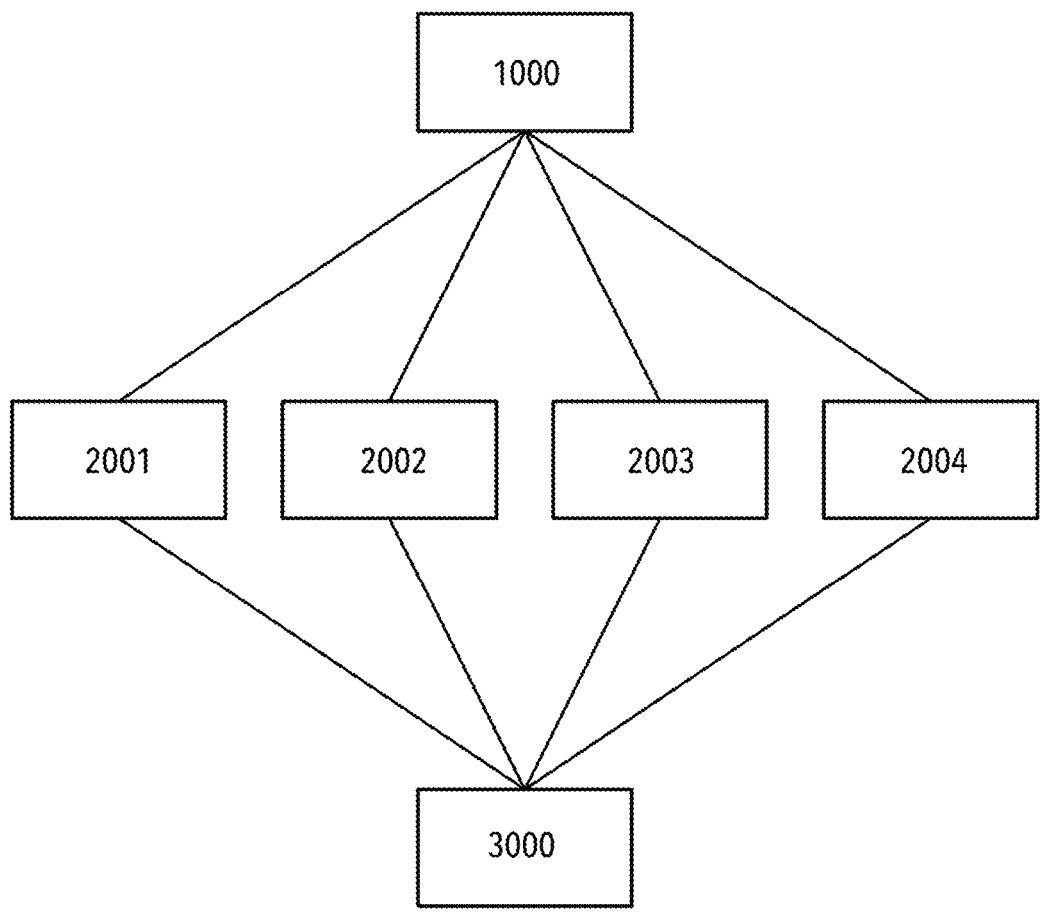
FIG. 4 is a flow diagram of an embodiment of a method for detecting defects in the closure of encapsulated vials according to the present invention.

FIG. 4 is a flow diagram of an embodiment of a method for detecting defects in the closure of encapsulated vials according to the present invention. Said method begins with the first step -1000- which consists in scanning or measuring a profile of the capsule and of the vial using a profilometer in order to obtain a point cloud corresponding to said profile of the capsule and of the vial. In the embodiment shown, said measurement is taken in one plane, in other words, two-dimensionally.

Following the first step -1000- at least one of the following sub-steps is carried out: calculating the diameter or radius of the closure circumference of the capsule -2001-, calculating the angle of intersection between the lower skirt and the side of the capsule -2002-, calculating the length of the lower skirt -2003-, measuring the distance from the end of the lower skirt to the neck of the vial -2004-.

The third step -3000- consists in determining whether or not any of the parameters calculated in steps -2001-, -2002-, -2003-, -2004- exceeds a predetermined limit value. If any of said parameters does exceed the respective limit value, this means that the encapsulation is incorrect or defective. Although there are also possible embodiments in which only one of said parameters is evaluated, it is recommended that all, or at least a pair thereof, are evaluated, as the more parameters evaluated, the greater the certainty that the encapsulation of the vial is satisfactory and complies with all the established requirements. It is important to mention that embodiments are also possible which evaluate more parameters than those calculated in steps -2001-, -2002-, -2003-, -2004-.

In the embodiment shown, the limit value of each parameter may be modified depending on the type of vial, the type of capsule, etc. To do this, the control device may store a database or similar containing optimal limit values for each type of vial and capsule.

Figure 5:
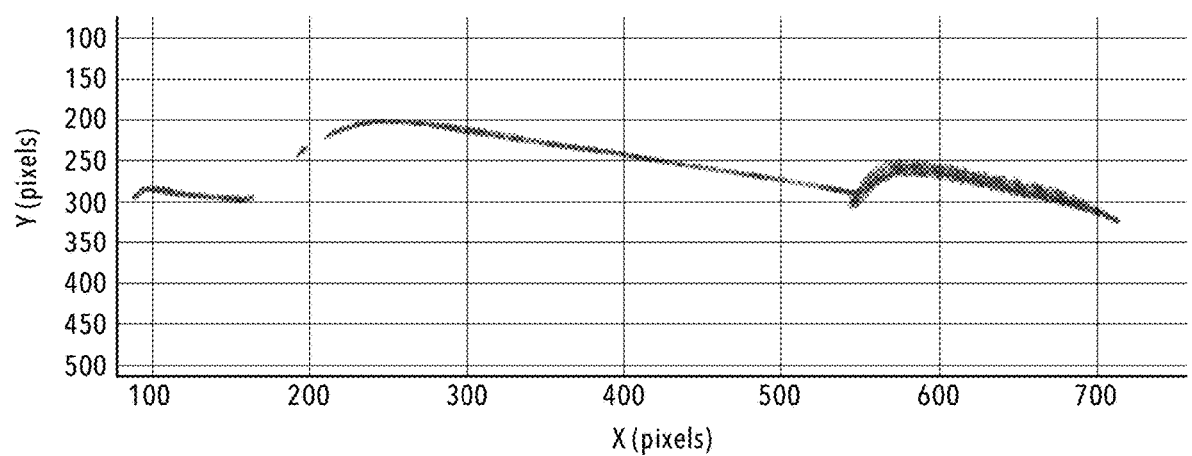
FIG. 5 shows the results of the measurement of a profile of an encapsulated vial using an embodiment of a device for detecting defects in the closure of encapsulated vials according to the present invention and using an exposure time of 40 μs.

FIG. 5 shows the results of the measurement of a profile of an encapsulated vial using an embodiment of a device for detecting defects in the closure of encapsulated vials according to the present invention and using an exposure time of 40 µs.

Figure 6:
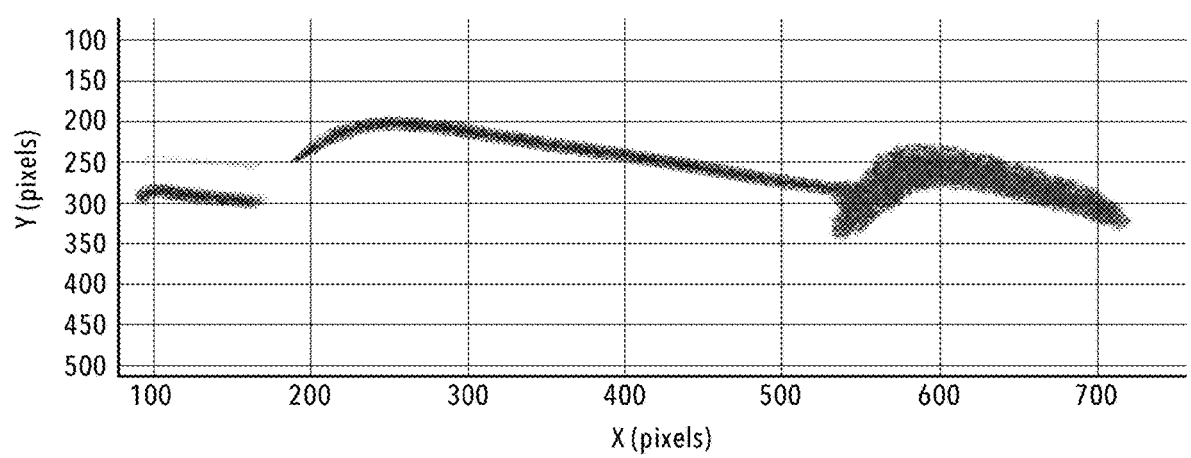
FIG. 6 shows the results of the measurement of a profile of an encapsulated vial using an embodiment of a device for detecting defects in the closure of encapsulated vials according to the present invention and using an exposure time of 300 μs.

FIG. 6 shows the results of the measurement of a profile of an encapsulated vial using an embodiment of a device for detecting defects in the closure of encapsulated vials according to the present invention and using an exposure time of 300 µs.

Given that the vials and the respective caps and/or capsules thereof are usually made of different materials and, consequently, have different optical properties, a particular exposure time of the profilometer may measure a portion of the profile of the vial-capsule assembly reliably and nevertheless produce imprecise measurements on another portion owing to the reflexions of the laser beam on the surface measured. To avoid these problems, in the embodiment shown in the figures, the profilometer -10- measures a particular profile of the vial -20- (see FIG. 3) using two different exposure times; in other words, it measures the same profile twice, each time using a different exposure time, in order subsequently to combine both measurements thus obtaining a precise measurement along the entire profile of the vial -20- (see FIG. 7).

As can be seen in FIGS. 5 and 6, in the embodiment shown, a first exposure time is 40 µs and a second exposure time is 300 µs. However, in other embodiments said exposure times may be different. Both figures show the raw measurement, that is, without carrying out any processing, obtained by the profilometer -10-. Although the embodiment shown only uses two different exposure times, other embodiments of the present invention may use more than two different exposure times.

The device for detecting defects in the closure of encapsulated vials according to the present invention may vary the exposure times depending on the typology of the vial and capsule that is to be measured. To do this, the control device may store a database or similar containing the optimal exposure times for each type of vial and capsule.

Figure 7:
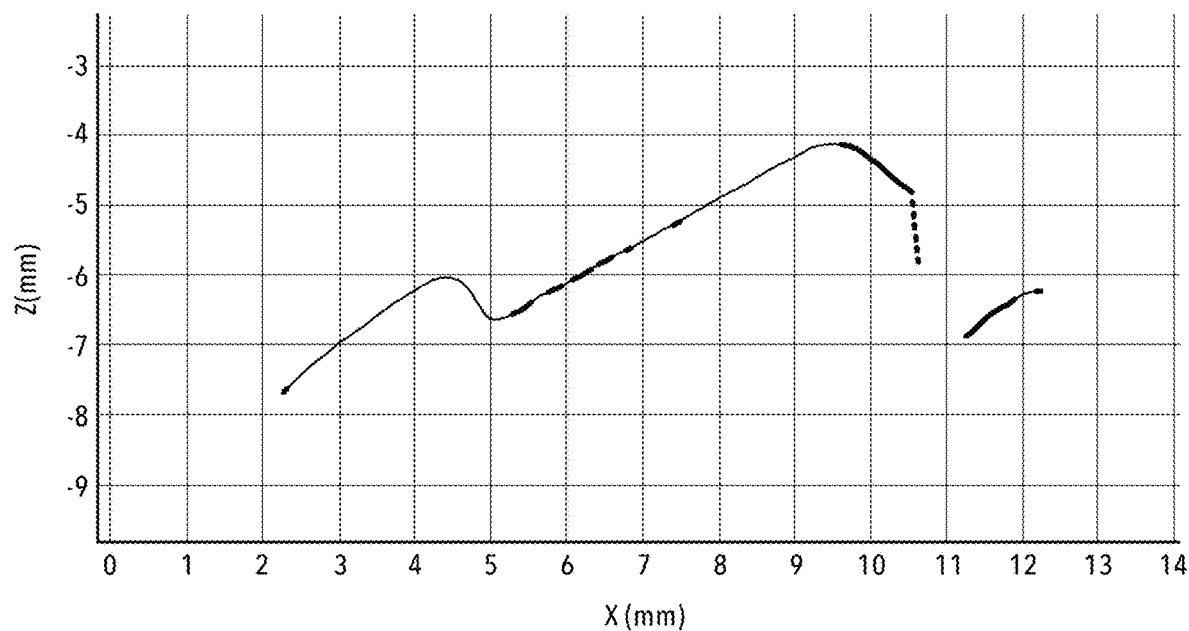
FIG. 7 is a graph of a point cloud corresponding to a profile of an encapsulated vial resulting from the combination of the measurements of FIGS. 5 and 6.

FIG. 7 is a graph of a point cloud corresponding to a profile of an encapsulated vial resulting from the combination of the measurements of FIGS. 5 and 6. This figure shows the points obtained from the measurement using a laser profilometer -10- and an exposure time of 300 µs (see FIG. 6) as a fine line and the points obtained from the measurement using a laser profilometer -10- and an exposure time of 40 µs (see FIG. 5) as a thick line.

As can be seen, in FIG. 7 the units of the abscissa and ordinate axes are in mm, whereas in FIGS. 5 and 6 the units are in pixels. As will be seen, in FIGS. 8 to 12 the units used on the abscissa and ordinate axes are also in mm. The units used in FIGS. 5 to 12 are merely illustrative and are simply an example. In other embodiments different units, for example inches, may be used.

In FIG. 7 an essentially continuous line can be seen which represents a profile of the vial and the capsule thereof. However, a discontinuity or gap can be seen in said line, corresponding to the separation or distance between the end of the lower skirt of the capsule and the neck of the vial -20-.

Based on the graph of FIG. 7, FIGS. 8 to 12 show the determination of different parameters which allow the presence of defects in the encapsulation of the vial to be evaluated. Unlike FIG. 7, in which the profile has been shown with a fine or thick line depending on the exposure time with which the profilometer obtained the data, to improve the clarity of FIGS. 8 to 12, the profile has been shown with a uniform line. For illustrative and didactic reasons, each of FIGS. 8 to 12 shows only an enlargement of the specific area of FIG. 7 on which the calculation is carried out, thus omitting the illustration of the other portions. However, it should be understood that the device and method according to the present invention operate with the entire profile obtained, shown as an example in FIG. 7.

Figure 8:
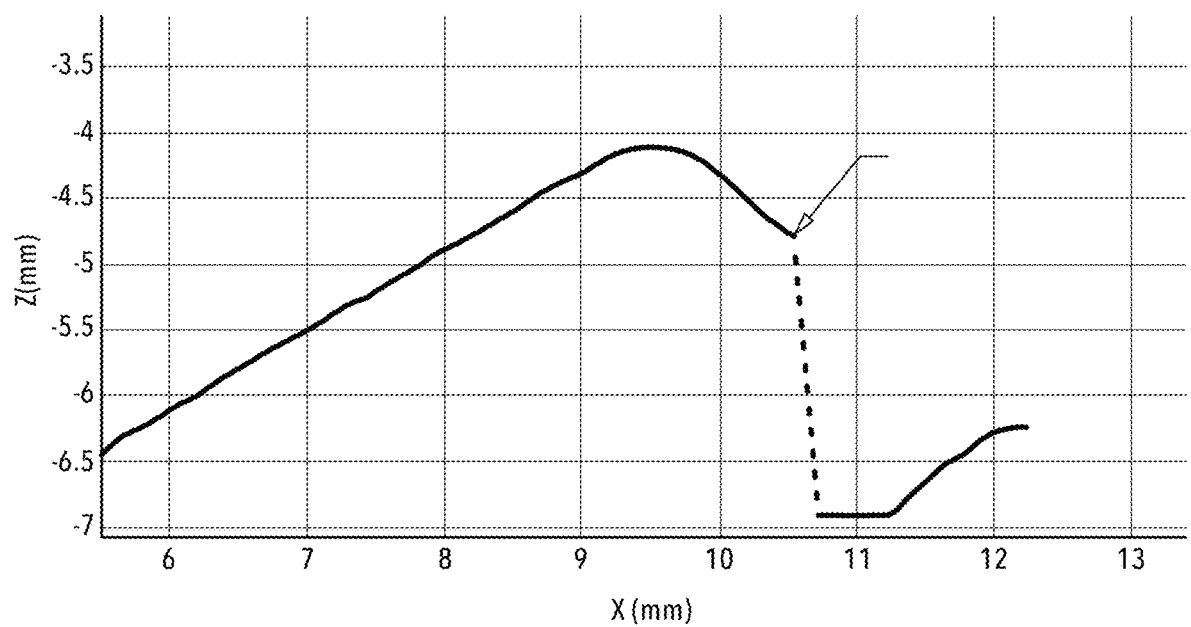
FIG. 8 shows the point corresponding to the end of the lower skirt of the capsule of the vial in the graph of FIG. 7.

In FIG. 8 the point corresponding to the end of the lower skirt of the capsule of the vial can be seen. In this figure the end point of the lower skirt is indicated by a hollow arrow. Although the determination of the end point of the lower skirt is not in itself indicative of the correct or incorrect state of the encapsulation of the vial, as will be detailed below, it certainly is important for determining the different parameters to be evaluated.

Figure 9:
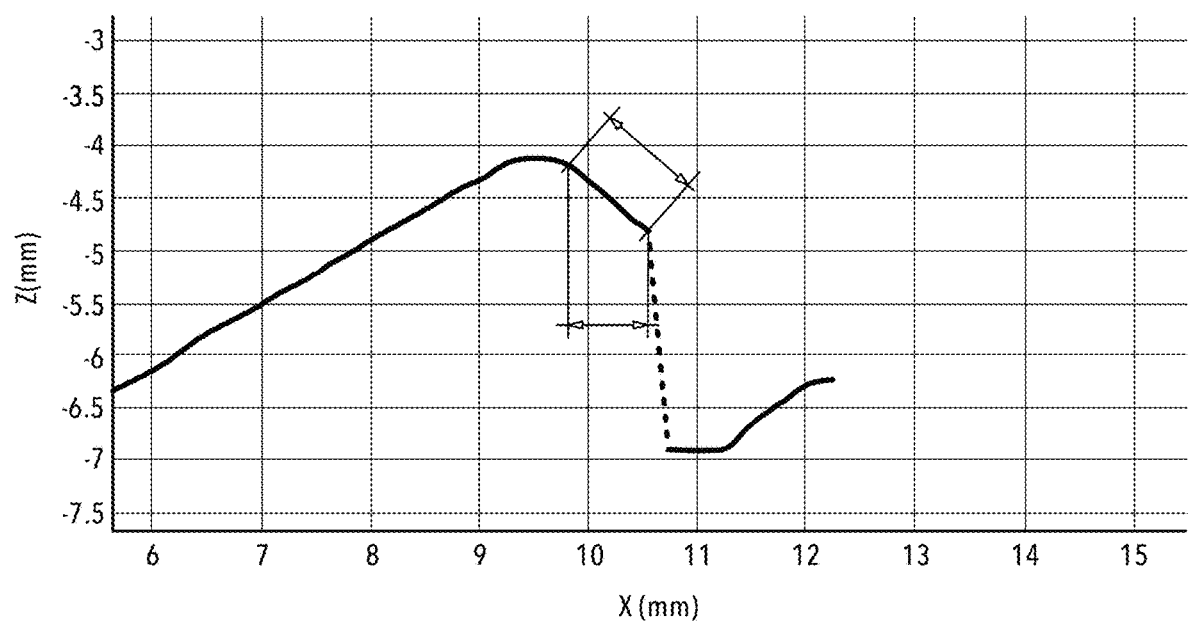
FIG. 9 shows the measurement of the length of the lower skirt of the capsule of the vial based on the graph of FIG. 8.

FIG. 9 shows the measurement of the length of the lower skirt of the capsule of the vial. To determine the length of the lower skirt of the capsule of the vial the two ends of the vial must be determined. The determination of one of which, more specifically the far end, is shown in FIG. 8. Consequently, the initial point of the lower skirt must be determined, or more specifically, the end point of the fold between the side and the lower skirt of the capsule, i.e. the point where the fold between the side and the skirt ends and said lower skirt begins. By approximating the fold between the side and the lower skirt to an arc of circumference, or to a circumference (see FIG. 11), and approximating the lower skirt to a straight line (see FIG. 10), the initial point of the skirt can be approximated as the point of tangency between said circumference and said straight line.

Once the two ends of the lower skirt have been determined, the length thereof can be measured as the straight line distance between the two points (see dimension line on the graph), the distance between the projections of both points on the abscissa axis (see dimension line on the graph) and/or the distance between the projections of both points on the ordinate axis (for illustrative purposes, the drawing thereof has been omitted in FIG. 9).

If the length of the lower skirt is less than a predetermined threshold value depending on the type of vial and capsule, this means that the encapsulation may not be properly attached to the neck of the vial and that said encapsulation is therefore defective. An example of this type of defect can be seen in FIG. 2. It may also be the case that the length of the lower skirt is greater than the permitted or desired length, that is, that the length exceeds an upper limit value.

Figure 10:
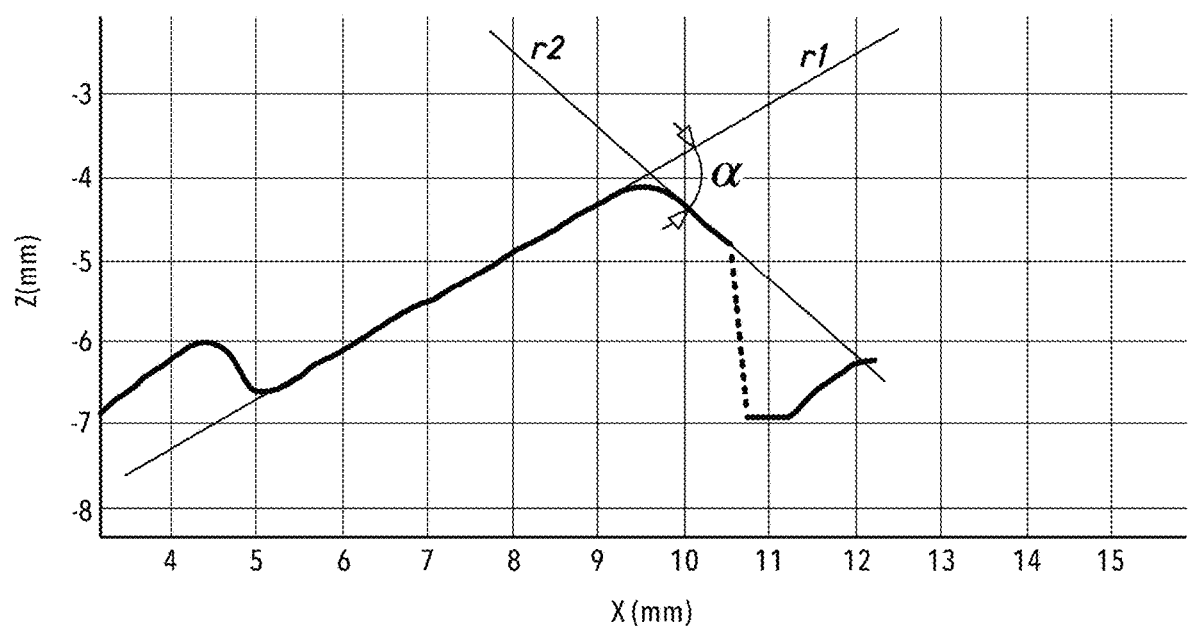
FIG. 10 shows the determination of the angle of intersection between the lower skirt and the side of the capsule of the vial based on the graph of FIG. 7.

FIG. 10 shows the determination of the angle of intersection between the lower skirt and the side of the capsule of the vial. To do this, the regression line of the side of the capsule and of the lower skirt of said capsule, -r1- and -r2-, respectively, is calculated. Once both regression lines -r1-,-r2- have been calculated, the angle -α- which is formed therebetween is calculated. Said angle -α- indicates "how open or closed" the lower skirt of the capsule is. In the embodiment shown, a small angle -α- indicates that the lower skirt is too open, that is, is not properly attached to the neck of the vial, and therefore, among other possibilities, the capsule might not form a hermetic seal or might even come loose. An example of said defect can be seen in FIG. 2.

Figure 11:
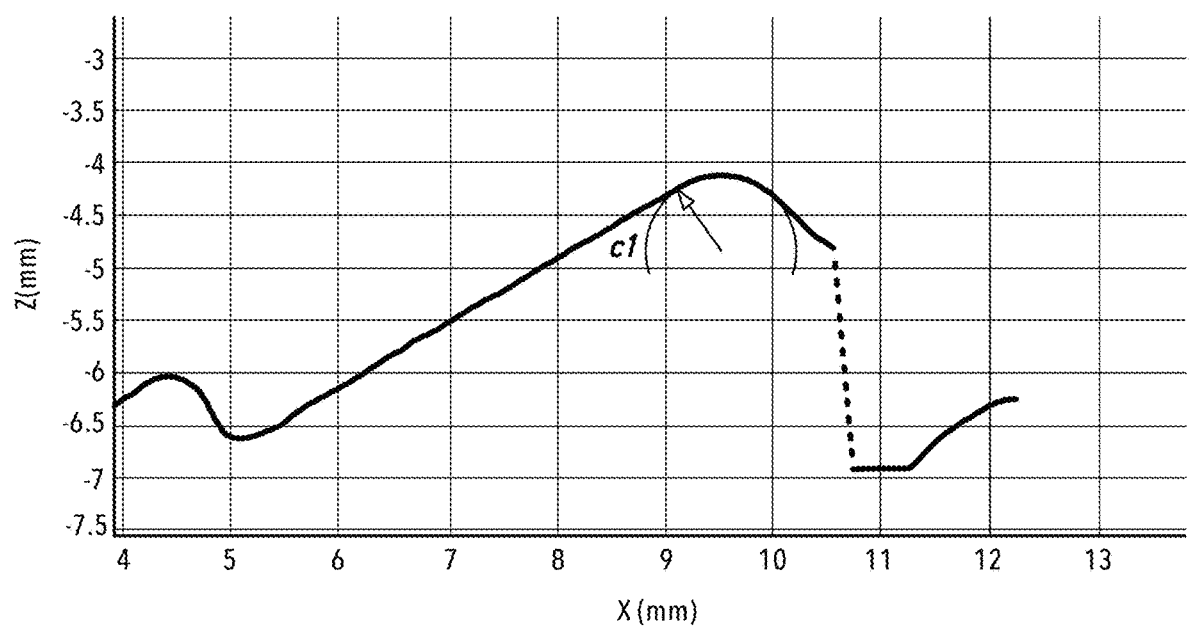
FIG. 11 shows the determination of the radius of the closure circumference of the capsule from the graph of FIG. 7.

FIG. 11 shows the determination of the radius of the closure circumference of the capsule. To do this, from the point cloud corresponding to the fold between the side and the lower skirt of the capsule a regression circumference -c1- is calculated, which conforms as closely as possible to the points measured using the laser profilometer -10-. Once the regression circumference -c1- is calculated it is assumed that the closure circumference is equal to said regression circumference -c1-, and then the diameter and/or radius of said closure circumference is measured and/or calculated. Said radius and/or diameter of the closure circumference is an indication of whether or not the lower skirt is correctly folded, since an excessive diameter and/or radius, in other words, one which exceeds a predetermined limit value, is an indication that the lower skirt may be too open or, put another way, insufficiently folded.

Figure 12:
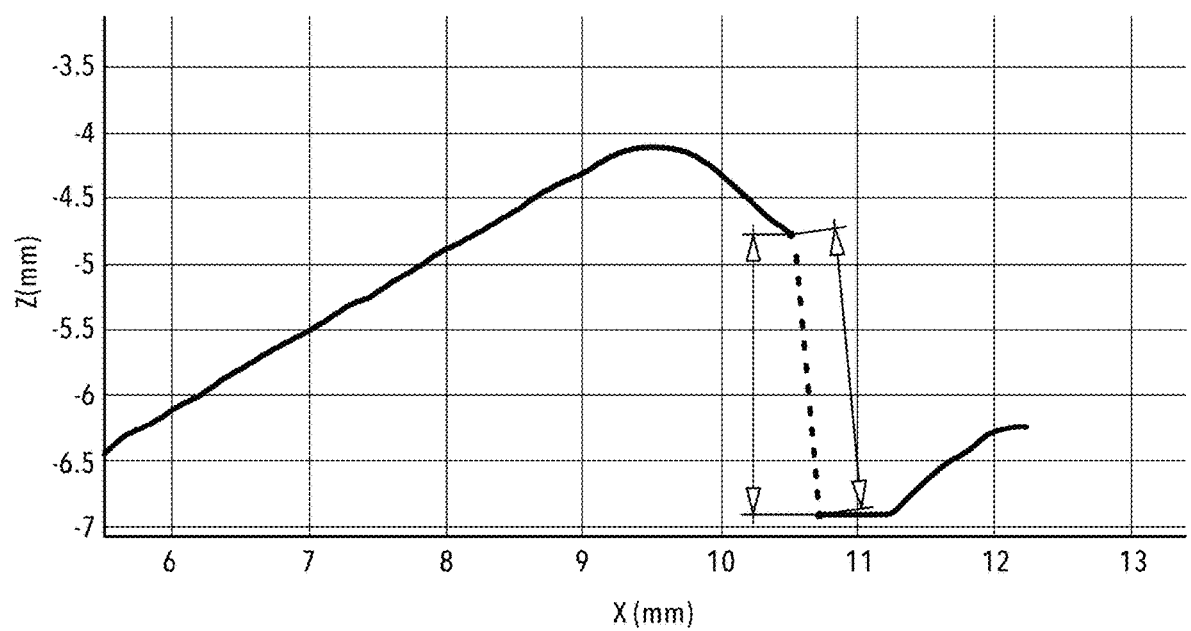
FIG. 12 shows the determination of the distance from the end of the lower skirt to the neck of the vial from the graph of FIG. 7.

FIG. 12 shows the determination of the distance from the end of the lower skirt to the neck of the vial. For this calculation the end point of the lower skirt must have been determined. If said end point has previously been determined, the device and the method according to the present invention make use of the calculation already made. If said calculation has not yet been determined the end point of the lower skirt is determined in a way similar to that illustrated as an example in FIG. 8.

Once the end point of the lower skirt of the capsule of the vial has been determined, the next step consists in determining the end point of the neck of the vial, in other words, from among the entire point cloud measured by the laser profilometer -10-, the first point corresponding to the neck of the vial, which, more specifically, is the first point following the gap which appears in the point cloud measured. In FIGS. 7 to 12 said gap has been shown as a broken line and represents the separation between the lower skirt of the capsule and the neck of the vial.

In the embodiment shown, said separation between the lower skirt of the capsule and the neck of the vial can be measured in two different ways. The first consists in measuring the length of the straight line which connects the two end points, in other words, the length of the straight line which connects the end point of the lower skirt to the end point of the neck of the vial. The second consists in measuring the separation between the end point of the lower skirt and the end point of the neck of the vial as the distance between both points in the respective projection thereof on the ordinate axis. In FIG. 12 a pair of dimension lines has been shown illustrating both ways of measuring the separation or distance between the lower skirt of the capsule and the neck of the vial.

Although in this embodiment in order to determine the distance from the end of the lower skirt to the neck of the bottle the end point of the lower skirt of the vial is first determined and then the end point of the neck of the vial is determined, embodiments also exist where said order is reversed.

All the data and graphs processing shown can be carried out automatically in the control device comprised in the device for detecting defects in encapsulated vials according to the present invention. To do this said control device has special software for processing and analysing data and graphs.

Although the invention has been presented and described with reference to embodiments thereof, it should be understood that said embodiments do not limit the invention, and so it is possible to vary multiple structural or other details which might be evident to persons skilled in the art after interpreting the subject matter disclosed in the present description, claims and drawings. In particular, in principle and unless explicitly stated otherwise, all the characteristics of each of the different embodiments and alternatives shown and/or suggested can be combined with one another. Thus, all variants and equivalents will be included within the scope of the present invention if they can be considered covered by the broadest scope of the following claims.

The invention claimed is:

1. Method for detecting defects in closure of encapsulated cap and vial assemblies, the method comprising the following steps:
   a) Scanning a profile of a capsule and of the vial using measurements of a profilometer, said profile corresponding to a generatrix of the vial which defines a head, a side and a lower skirt of said capsule, sealing a portion of the cap and a portion of the vial;
   forming a point cloud from the measurements of the scanning by the profilometer;
   b) From the point cloud formed in the previous step, calculating at least one of the following parameters:
      i. Diameter or radius of a closure circumference of the capsule, said closure circumference being defined by a circumference defined by a fold of the lower skirt of the capsule relative to the side of the capsule;
      ii. Angle of intersection between the lower skirt and the side of the capsule;
      iii. Length of the lower skirt of the capsule;
      iv. Distance from an end of the lower skirt of the capsule to a neck of the vial;
   c) Determining whether any parameter calculated in the previous step exceeds a predetermined limit value, said limit value indicating whether encapsulation is or is not correct.

2. Method according to claim 1, wherein said point cloud is obtained using a laser profilometer.

3. Method according to claim 1 wherein calculation of the diameter or radius of the closure circumference of the capsule comprises the following steps:
   a) Calculating a regression circumference of the closure of the capsule from the point cloud of the side and lower skirt of the capsule;
   b) Measuring the diameter or radius of the regression circumference, estimating that said regression circumference is equal to the closure circumference of the capsule.

4. Method according to claim 1, wherein calculation of the angle of intersection between the lower skirt and the side of the capsule comprises the following steps:
   a) Calculating a regression line of the side of the capsule from the point cloud;
   b) Calculating a regression line of the lower skirt of the capsule from the point cloud;
   c) Determining a point of intersection between both regression lines and an angle formed between the regression lines.

5. Method according to claim 1, wherein calculation of the length of the lower skirt comprises the following steps:
   a) Determining an end point of the lower skirt;
   b) Determining an end point of the fold between the side and the lower skirt of the capsule;
   c) Measuring a distance between both points.

6. Method according to claim 1, wherein calculation of the distance from the end of the lower skirt to the vial comprises the following steps:
   a) Determining an end point of the lower skirt, if not previously determined;
   b) Determining an end point of the neck of the vial;
   c) Measuring a distance between both points.

7. Device for detecting defects in the closure of encapsulated vials, comprising a profilometer configured to scan a profile of the capsule and of the vial and a control device configured to execute a method according to claim 1.

8. Device according to claim 7, wherein said profilometer is a laser profilometer.

9. Device according to claim 7, wherein said profilometer is a two-dimensional profilometer.

10. Device according to claim 7, further comprising a vial supply device.

11. Device according to claim 10, wherein said vial supply device operates continuously.

12. Device according to claim 7, wherein said profilometer measures the profile using two different exposure durations.

13. Device according to claim 7, comprising means for rotating the vial on a longitudinal axis, thus obtaining the profile of the capsule and of the vial along the entire circumference of said capsule and vial.

14. Device according to claim 7, comprising means for rotating the profilometer about a longitudinal axis of the vial, thus obtaining the profile of the capsule and of the vial along the entire circumference of said capsule and vial.

15. The method according to claim 1, comprising measuring the profile with said profilometer using two different exposure durations.

16. The method according to claim 15, wherein a first exposure has a duration between 20 μs and 100 μs and a second exposure has a duration between 150 μs and 500 μs.

17. The method according to claim 15, wherein a first exposure has a duration between 30 μs and 50 μs and a second exposure has a duration between 250 μs and 350 μs.

* * * * *